United States Patent
Ravitz

(10) Patent No.: US 6,684,773 B2
(45) Date of Patent: Feb. 3, 2004

(54) TARGET AND ALGORITHM FOR COLOR LASER PRINTHEAD ALIGNMENT

(75) Inventor: Cary Patterson Ravitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 10/103,398

(22) Filed: Mar. 21, 2002

(65) Prior Publication Data

US 2003/0177929 A1 Sep. 25, 2003

(51) Int. Cl.⁷ .................................................. B41F 13/00
(52) U.S. Cl. ........................ 101/211; 101/485; 101/490; 101/181
(58) Field of Search ................................... 101/211, 483, 101/484, 485, 248, 490, 181; 347/15, 19; 358/1, 9; 399/301, 49

(56) References Cited

U.S. PATENT DOCUMENTS

| | | | |
|---|---|---|---|
| 4,528,630 A | | 7/1985 | Sargent |
| 4,534,288 A | | 8/1985 | Brovman |
| 4,546,700 A | | 10/1985 | Kishner et al. |
| 4,679,071 A | * | 7/1987 | Kitagawa ............... 101/181 |
| 5,020,116 A | | 5/1991 | Macaulay |
| 5,046,110 A | | 9/1991 | Carucci et al. |
| 5,138,667 A | * | 8/1992 | Roch ....................... 101/181 |
| 5,181,257 A | | 1/1993 | Steiner et al. |
| 5,205,211 A | | 4/1993 | Edwards |
| 5,276,459 A | | 1/1994 | Danzuka et al. |
| 5,402,726 A | * | 4/1995 | Levien ...................... 101/484 |
| 5,523,823 A | | 6/1996 | Ashikaga |
| 5,530,460 A | * | 6/1996 | Wehl ........................ 347/19 |
| 5,534,895 A | | 7/1996 | Lindenfelser et al. |
| 5,627,649 A | | 5/1997 | Sawayama et al. |
| 5,631,686 A | | 5/1997 | Castelli et al. |
| 5,689,425 A | * | 11/1997 | Sainio et al. ............... 101/181 |
| 5,729,353 A | | 3/1998 | Sawayama et al. |
| 5,796,414 A | | 8/1998 | Sievert et al. |
| 5,806,430 A | | 9/1998 | Rodi |
| 5,813,333 A | | 9/1998 | Ohno |
| 5,835,108 A | | 11/1998 | Beauchamp et al. |
| 5,854,958 A | | 12/1998 | Tanimoto et al. |
| 5,909,235 A | | 6/1999 | Folkins |
| 5,964,149 A | | 10/1999 | Venneri et al. |
| 5,974,967 A | | 11/1999 | Bravenec et al. |
| 6,000,776 A | | 12/1999 | Suzuki et al. |
| 6,022,154 A | * | 2/2000 | Allen ........................ 101/248 |
| 6,065,400 A | | 5/2000 | Van Weverberg |
| 6,076,915 A | | 6/2000 | Gast et al. |
| 6,084,606 A | | 7/2000 | Moriyama |
| 6,109,183 A | | 8/2000 | Papritz et al. |
| 6,129,015 A | | 10/2000 | Dewey |
| 6,148,168 A | | 11/2000 | Hirai et al. |
| 6,164,749 A | | 12/2000 | Williams |
| 6,172,771 B1 | | 1/2001 | Ikeda et al. |
| 6,192,801 B1 | | 2/2001 | Papritz et al. |
| 6,198,490 B1 | | 3/2001 | Eom et al. |
| 6,198,549 B1 | | 3/2001 | Decker et al. |
| 6,198,896 B1 | | 3/2001 | Nakayasu et al. |
| 6,219,517 B1 | | 4/2001 | Takahashi et al. |
| 6,229,554 B1 | | 5/2001 | Matsuzuki |

(List continued on next page.)

Primary Examiner—Eugene H. Eickholt
(74) Attorney, Agent, or Firm—John A. Brady

(57) ABSTRACT

A method of determining misalignment of color planes within an image forming apparatus. A first pattern is formed with a first color and comprises first and second sections. A second pattern is formed with a second color and positioned within the first and second sections of the first pattern. The alignment of the two color planes is determined by the difference in the amount of color within the first and second sections. The amount of misalignment may further be determined by the ratio of the difference in the amount of color within the sections and the sum of the amount of color within the sections. Perfect alignment of the two color planes results in equal color amounts in each section.

21 Claims, 10 Drawing Sheets

U.S. PATENT DOCUMENTS

| | | |
|---|---|---|
| 6,300,968 B1 | 10/2001 | Kerxhalli et al. |
| 6,317,220 B1 * | 11/2001 | Fujita et al. .................. 358/1.9 |
| 6,356,363 B1 * | 3/2002 | Cooper et al. ................ 358/1.9 |
| 6,408,156 B1 * | 6/2002 | Miyazaki et al. ............ 399/301 |
| 6,456,311 B1 * | 9/2002 | Teshigawar et al. ........... 347/19 |
| 6,499,822 B1 * | 12/2002 | Abe et al. ...................... 347/19 |
| 2001/0036370 A1 * | 11/2001 | Inoue ............................ 399/49 |
| 2002/0024548 A1 * | 2/2002 | Gutoh et al. ................... 347/15 |
| 2002/0104457 A1 * | 8/2002 | Brydget et al. .............. 101/484 |
| 2003/0016263 A1 * | 1/2003 | Takahashi et al. ............. 347/19 |
| 2003/0067503 A1 * | 4/2003 | Cunnagh et al. ............... 347/19 |

* cited by examiner

US 6,684,773 B2

TARGET AND ALGORITHM FOR COLOR LASER PRINTHEAD ALIGNMENT

BACKGROUND OF THE INVENTION

Color laser and LED printers produce images using a combination of separate color planes. The printers include a number of different image forming units that each produce the image in a single color. The final image is formed of a combination of each of the overlapping each of the single color images. By way of example, a four color laser printer includes four separate printheads that each form an image of a single color on an intermediate transport mechanism or a media sheet. As the mechanism or sheet moves through the printer, the first printhead forms an image in yellow, a second in cyan, third unit in magenta, and fourth in black. Each of the single color images are accurately formed in an overlapping arrangement to produce the final multi-color image.

Misalignment occurs when one or more of the printheads is not accurately aligned. Often times, misalignment occurs when the image forming apparatus is initially manufactured. Misalignment may further occur gradually over time as the apparatus is in use. Misalignment of one or more of the colors planes results in poor quality images having poor resolution and coloring. The greater the amount of misalignment, the poorer the image quality.

Various prior art methods of color plane alignment have been used to overcome this problem. One method includes producing targets having two or more colors on the media sheet or transport mechanism. The targets are scanned by a high resolution scanner that precisely registers the positions of each of the color planes. High resolution scanners are often expensive, and require regular maintenance to perform properly.

Another method of color plane alignment includes producing targets on the media sheet or intermediate transfer mechanism and determining the location as the target is moved through a particular point within the image forming unit. In one example, the exact position of a point is determined on the media sheet or intermediate transfer mechanism. The target is then formed on the sheet or transport mechanism at a calculated distance from the exact location. Once the sheet is passed through a sensor, the sensed distance is compared to the calculated distance to determine the amount of misalignment. A drawback of this method is the offset of each color plane is determined relative to a particular point on the media sheet or intermediate transfer mechanism. Color plane offset is not determined relative to the other color planes.

SUMMARY OF THE INVENTION

The present invention is directed to methods of determining misalignment between color planes within an image forming unit. The methods include forming a first pattern with a first color, and forming a second pattern with a second color. The misalignment is determined by the difference in the amount of the second color within a first section of the first pattern to the amount of the second color within a second section of the first pattern. Misalignment may further be determined by the ratio of the second color amounts within the sections of the first pattern.

In one embodiment, the first pattern formed in a first color includes first and second non-printed sections that are separated by an intermediate section. The first and second sections may have a variety of orientations and dimensions. The second pattern formed in a second color is sized to extend over the intermediate section and into the first and second sections. When there is no misalignment, the amount of the second color is equal within the first and second sections. Increasing amounts of misalignment are determined by increasing differences in the amount of color within the two sections. The amount of misalignment may further be determined by a ratio of the amount of color within the first and second sections.

In one embodiment, the first and second patterns are formed and scanned into a bitmap format. The scanning process may result in fringe effects that distort the amount of color within the first and second sections. To compensate for these effects, the patterns may include a third section sized approximately equal to the first and second sections of the first pattern. The third section may be used for canceling the fringe effects from the first and second sections.

DETAILED DESCRIPTION

Figure 1:
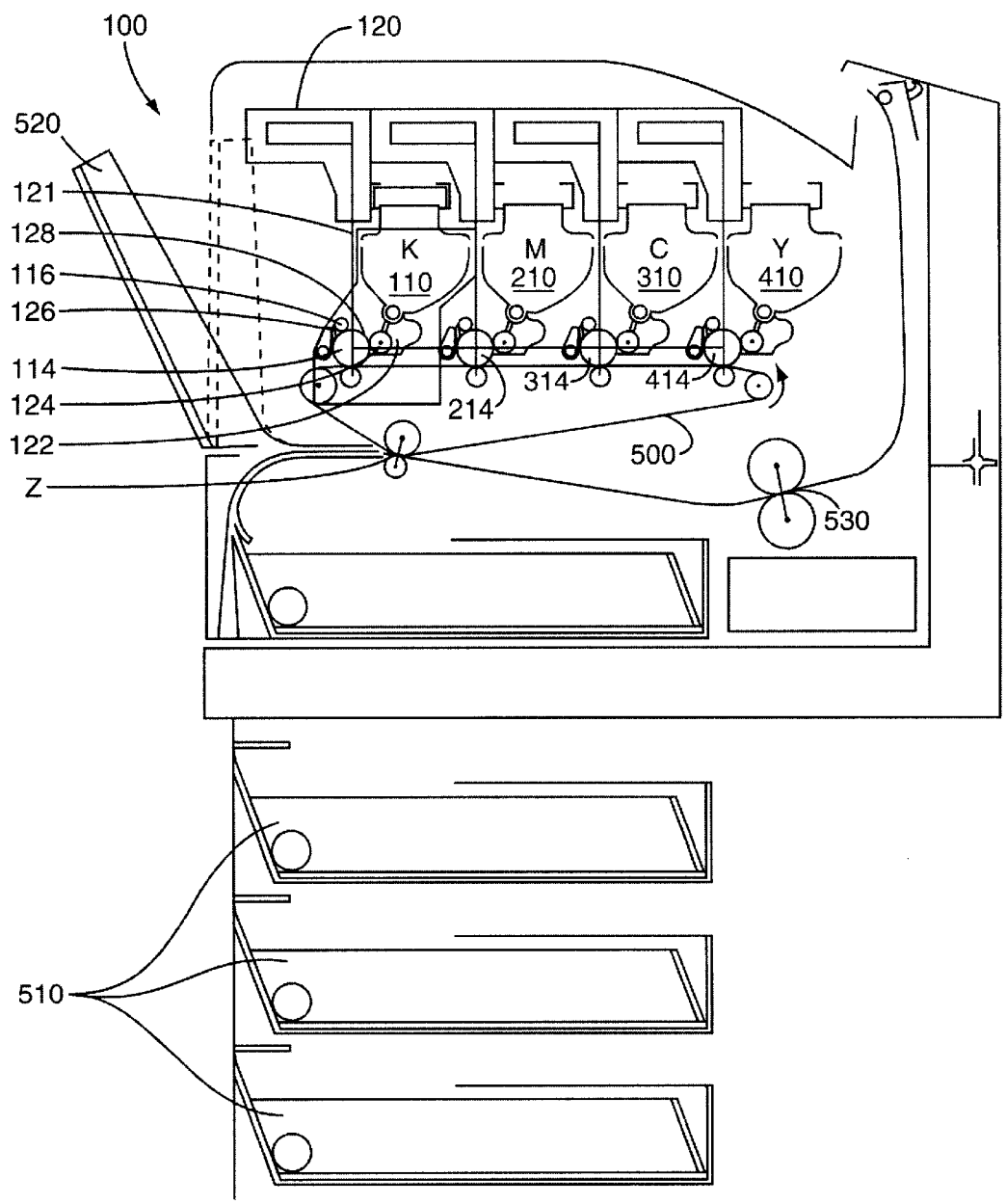
FIG. 1 is a side view of an image forming apparatus constructed according to one embodiment of the present invention.

The present invention is a method of aligning different color planes within an image forming apparatus. A first pattern 20 is formed with a first color and includes a first section 22 and a second section 24. A second pattern 30 is formed with a second color and positioned within the first and second sections 22, 24. The alignment of the two color planes is determined by scanning the two patterns 20, 30 and calculating the amount of color within each of the two sections 22, 24. The amount of misalignment is determined by the difference of color amount within the sections 22, 24. Perfect alignment of the two color planes results in equal color amounts in each section. In one embodiment, fringe effects caused during the scanning are cancelled.

FIG. 1 illustrates the basic elements of one embodiment of an image forming apparatus and is incorporated for an understanding of the overall electrophotographic image forming process. A four cartridge color laser printer is illustrated as 100, however one skilled in the art will understand that the present invention is applicable to other types of image forming devices that form images comprising two or more different colors. The image forming apparatus, generally designated 100, includes a plurality of similar image forming units 110, 210, 310, and 410. Each image forming unit is of a similar construction but is distinguished by the toner color contained therein. In one embodiment, the device 100 includes a black (K) unit 110, a magenta (M) unit 210, a cyan (C) unit 310, and a yellow (Y) unit 410. Each different color toner forms an individual image of a single color that is combined in layered fashion to create the final multi-colored image.

Each of the image forming units is substantially identical and includes a photoconductor, a developer device, and a cleaning device. As the units are identical except for the toner color, the unit and elements for forming black images will be described, with the other color image forming units being omitted for simplification.

The photoconductor 114 is generally cylindrically-shaped and has a smooth surface for receiving an electrostatic charge over the surface as the photoconductor rotates past charger 116. The photoconductor 114 uniformly rotates past a scanning laser 120 directed onto a selective portion of the photoconductor surface forming an electrostatically latent image across the width of the photoconductor representative of the outputted image. The photoconductor 114 rotates continuously so as to advance the photoconductor about $\frac{1}{600}^{th}$ or $\frac{1}{1200}^{th}$ of an inch between laser scans. This process continues as the entire image pattern is formed on the photoconductor surface.

After receiving the latent image, the photoconductor 114 rotates to the developer which has a toner bin, illustrated generally as 122 in FIG. 1, for housing the toner and a developer roller 124 for uniformly transferring toner to the photoconductor. The toner is transferred from the toner bin 122 to the photoconductor 114. The toner is a fine powder usually constructed of plastic granules that are attracted and cling to the areas of the photoconductor 114 that have been discharged by the laser scanning assembly 120.

The photoconductor 114 next rotates past an adjacently-positioned intermediate transport mechanism belt 500 (hereinafter, ITM belt) to which the toner is transferred from the photoconductor 114. As illustrated in FIG. 1, the ITM belt 500 is endless and extends around a series of rollers adjacent to the photoconductors. The ITM belt 500 and each photoconductor 114, 214, 314, 414 are synchronized providing for the toner from each photoconductor to precisely align on the ITM belt 500 during a single pass. By way of example as viewed in FIG. 1, the yellow toner will be placed on the ITM belt, followed by cyan, magenta, and black.

After depositing the toner on the ITM belt, the photoconductor 114 rotates through a cleaning area where residual toner is removed from the surface via a brush or scraper 126. The residual toner is moved along the length of the photoconductor 114 to a waste toner reservoir 109 where it is stored until the cartridge is removed from the image forming apparatus and disposed. In one embodiment, the photoconductor 114 further passes through a discharge area (not shown) having a lamp or other light source for exposing the entire photoconductor surface to light to remove any residual charge and image pattern formed by the laser.

As the photoconductors are being charged and gathering toner, a recording sheet, such as a blank sheet of paper, is being routed to intercept the ITM belt 500. The paper may be placed in one of the lower trays 510, or introduced into the image forming device through a side track tray 520. A series of rollers and belts transport the paper to point Z where the sheet contacts the ITM belt 500 and receives the toner. The sheet may receive an electrostatic charge prior to contact with the ITM belt 500 to assist in attracting the toner from the belt. The sheet and attached toner next travel through a fuser 530 having a pair of rollers and a heating element that heats and fuses the toner to the sheet. The paper with fused image is then transported out of the printer for receipt by a user.

Figure 2:
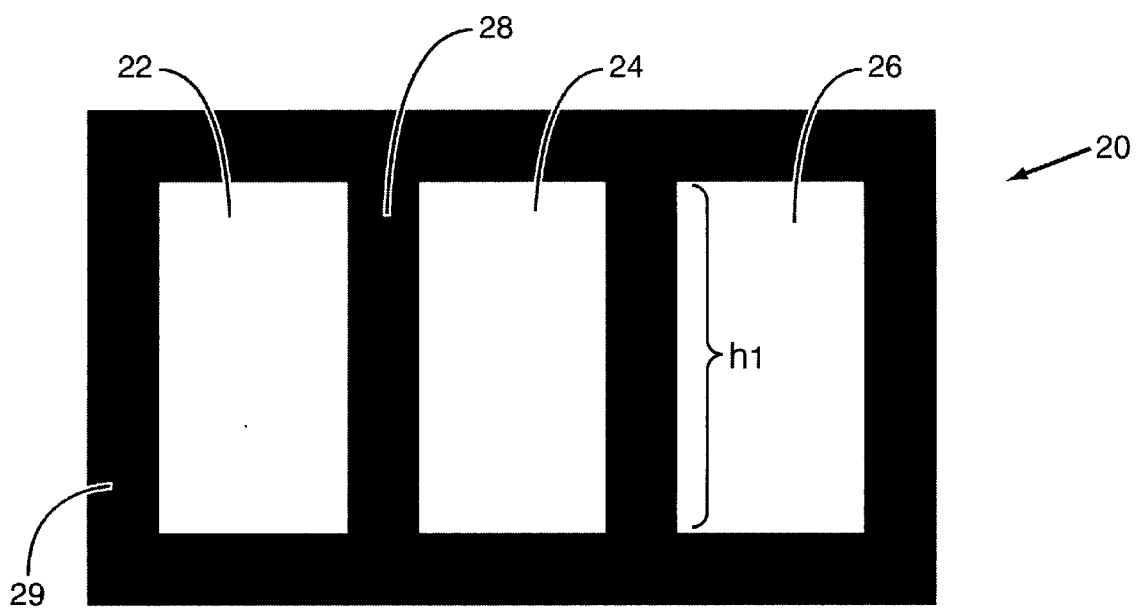
FIG. 2 is a side view of a first pattern in accordance with one embodiment of the present invention.
Figure 3:
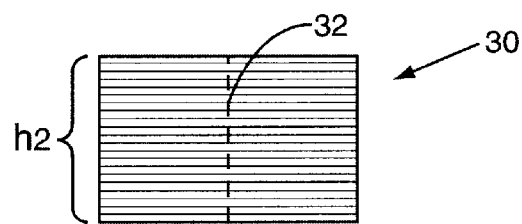
FIG. 3 is a side view of a second pattern formed in accordance with one embodiment of the present invention.
Figure 9:
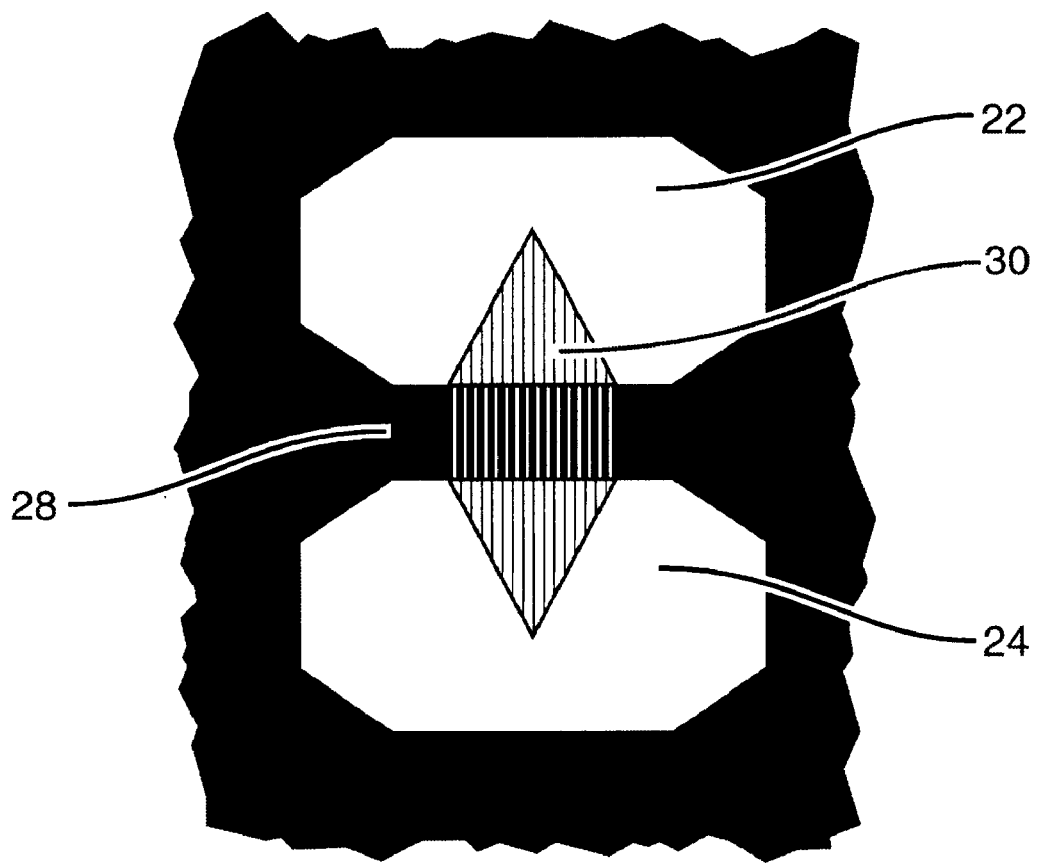
FIG. 9 is a side view illustrating one embodiment of overlapping first and second patterns.

One embodiment of the first 20 and second 30 patterns is illustrated in FIGS. 2 and 3. FIG. 2 illustrates the first pattern 20 printed from a first color and comprising non-printed first and second sections 22, 24. An intermediate section 28 is positioned between the first and second sections 22, 24, and the second and third sections 24, 26. A border 29 extends around the perimeter of the first pattern 20. The first and second sections 22, 24 are formed by the border 29 and intermediate sections 28. The third non-printed section 26 is the same shape and size as the first and second sections 22, 24 as will be discussed in more detail below. Another embodiment is illustrated in FIG. 9 comprising non-printed sections 22, 24 shapes in an extended octagon configuration.

FIG. 3 illustrates one embodiment of the second pattern 30 formed from a second color different from the first color. The second pattern 30 is symmetrical such that the shape and size is the same on each half of the center line 32. The center line 32 is shown within FIG. 3 to illustrate the symmetry between the two halves. The second pattern 30 is sized to extend into the first and second sections 22, 24 and across the intermediate section 28 of the first pattern 20. The size is not so large as to extend beyond the non-printed first and second sections 22, 24. The shape of the second pattern 30 may vary such as a rectangle as illustrated in FIG. 3, and a diamond as illustrated in FIG. 9.

In one embodiment, the height h1 of the non-printed sections 22, 24 is greater than the height h2 of the second pattern. This sizing makes the patterns insensitive to vertical misalignment and still determine the horizontal misalignment. By way of example, the second pattern may be placed at a variety of positions along the height of the intermediate section 28 and remain within the boundaries of the first and second printed sections 22, 24. In another embodiment, the height h2 of the second pattern is greater than the height h1 of the non-printed sections 22, 24 to make the patterns insensitive to vertical misalignment when determining horizontal misalignment. Likewise, the dimensions are sized for determining vertical misalignment and making horizontal misalignment insensitive.

The patterns 20, 30 are formed in an overlapping arrangement with one of the patterns being formed on top of the other pattern. The order of placement is not vital to the present invention, except for forming the patterns on the ITM belt 500. Therefore, the term "overlapping" used throughout can be defined as either the first pattern 20 formed over or under the second pattern 30. The term "order configuration" will be used to differentiate when the order is important.

Figure 4:
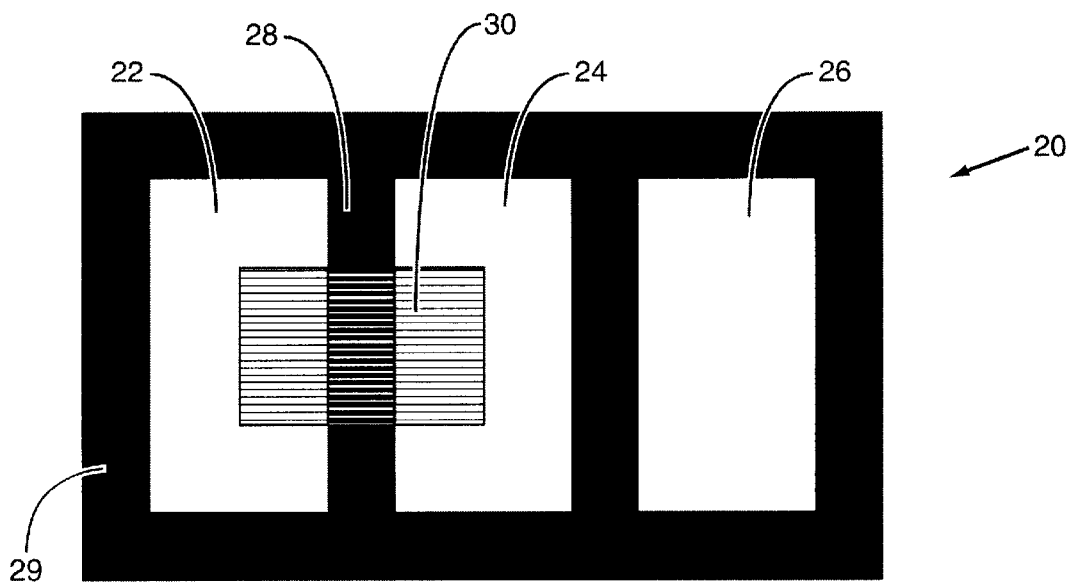
FIG. 4 is a side view illustrating the first and second patterns in overlapping orientation formed in accordance with one embodiment of the present invention.
Figure 5:
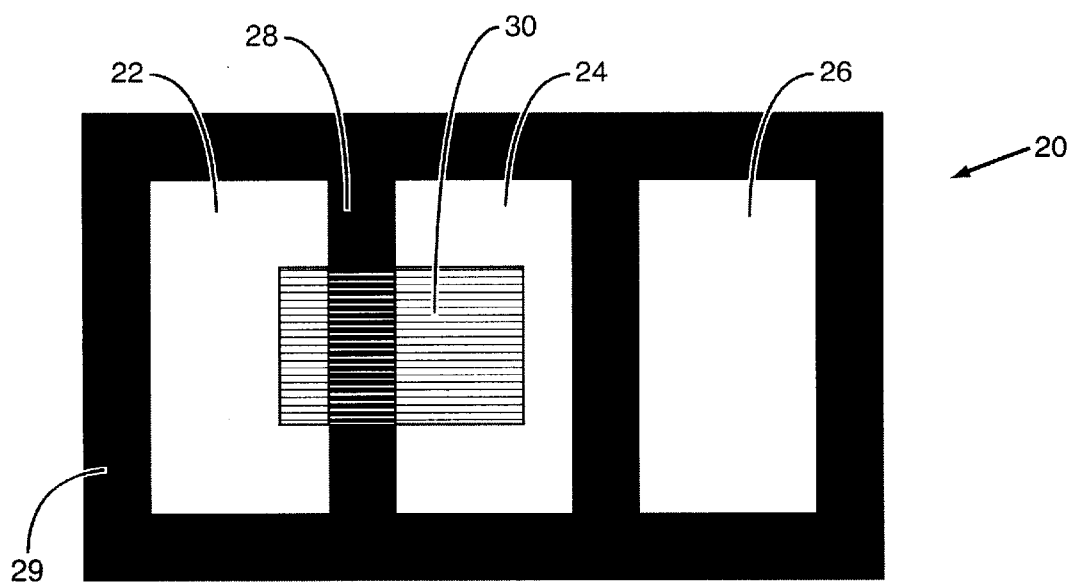
FIG. 5 is a side view illustrating the first and second patterns in overlapping orientation formed in accordance with another embodiment of the present invention.

FIG. 4 illustrates the first and second patterns 20, 30 formed in overlapping arrangement. The second pattern 30 extends into the first and second sections 22, 24 and across the intermediate section 28. FIG. 5 illustrates another embodiment of the first and second patterns 20, 30 formed in overlapping arrangement. A visual inspection illustrates that the color plane alignment of FIG. 4 is more accurate than that of FIG. 5. This is determined as the amount of the second pattern 30 within the first and second sections 22, 24 of the first pattern 20 is closer to being equal in FIG. 4 as opposed to FIG. 5 (which illustrates a larger amount of color being positioned within the second 5 section 24).

Figure 6:
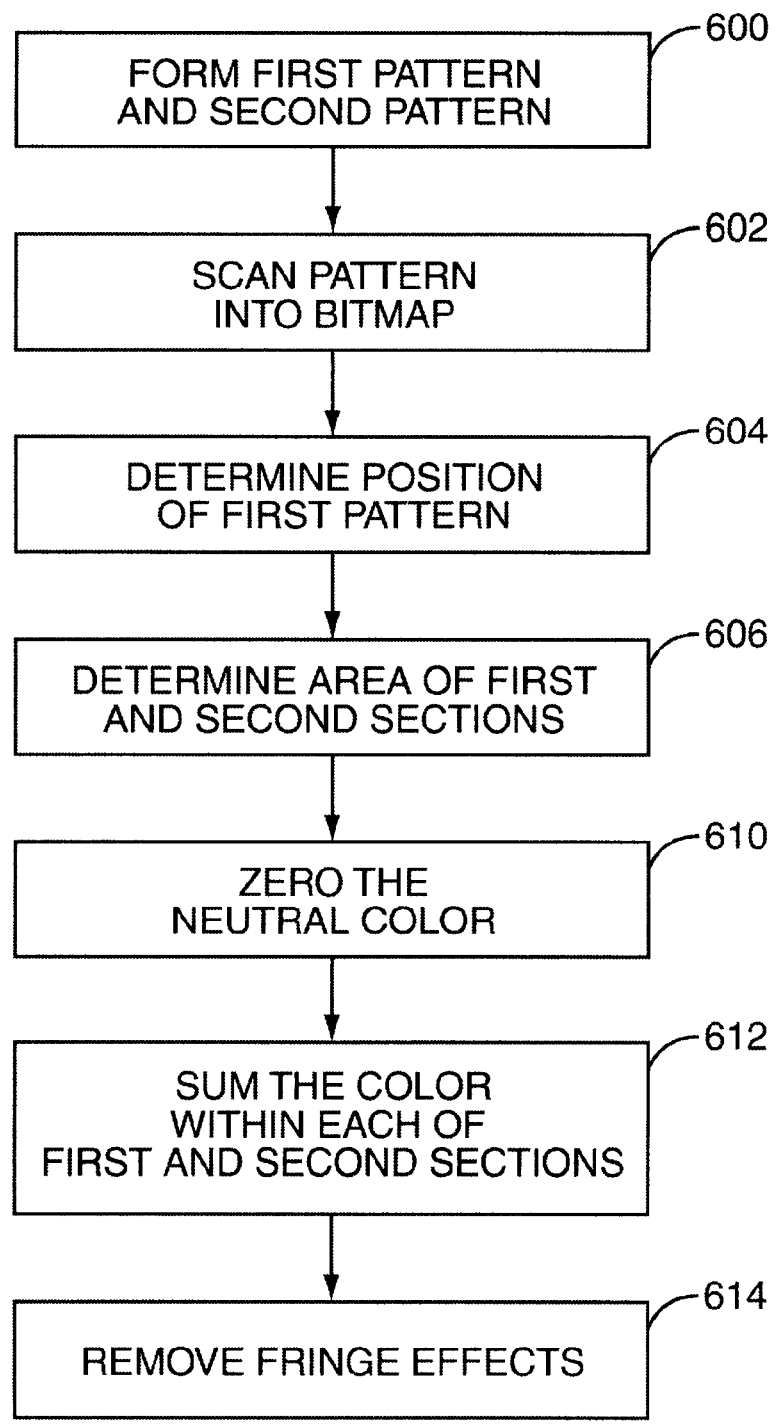
FIG. 6 is a flowchart diagram illustrating the steps of determining color plane alignment according to one embodiment of the present invention.

One embodiment of determining the misalignment between color planes is illustrated in the flowchart of FIG. 6. Initially, first and second patterns 20, 30 are positioned in an overlapping arrangement (step 600). In this embodiment, the first pattern 20 is formed in black, and the second pattern is formed in another color. The patterns 20, 30 are scanned into a bitmap format (step 602). The pattern data is converted in the bitmap format in a variety of color depths of various bits per pixel. Further, the bitmap may store the information in red-green blue format (hereinafter RGB) or cyan-magenta-yellow format (hereinafter CMY). In one embodiment, the scanner converts the information into a 24-bit RGB format that is converted into CMY format. In one conversion, the cyan component is equal to 255 less the red component (C=255−R); magenta is equal to 255 less the green component (M=255−G); and yellow is equal to 255 less the blue component (Y=255−B). The black component is the minimum of the CMY values. By way of example, a bitmap having CMY components of C=90, Y=125, and M=80, has a black component of 80. Once converted, the bitmap comprises each pixel defined in terms of a CMY component.

The position of the first pattern 20 is then determined (step 604) by analyzing the bitmap and determining the outer edges. There are various manners of determining the position of the first pattern 20 by using image analysis that is well known in the art. In one embodiment illustrated in FIG. 7, the position of the first pattern 20 is determined by finding the average between two concentric rectangles in which the outer rectangle 70 is solid white (from the non-printed media sheet) and the inner rectangle 72 is solid black. The position of the first pattern may also be determined by locating the four corners of the rectangular pattern, and analyzing the bitmap to determine an area of black approximately equal to the area of the first pattern 20.

Figure 7:
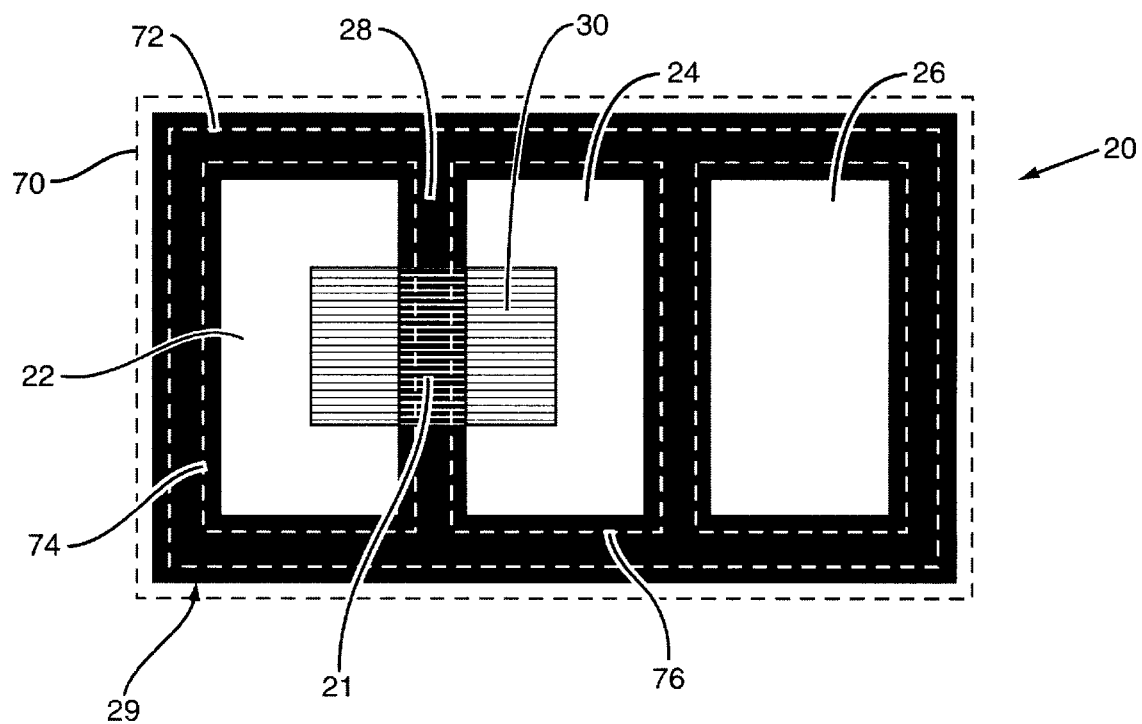
FIG. 7 is a side view illustrating the first and second patterns in overlapping orientation and outlines illustrating sections of the first pattern according to one embodiment of the present invention.

The next step is determining the area of the first and second sections 22, 24 (step 606). In one embodiment, the position of the first section 22 is determined relative to the position of the first pattern 20. Because the dimensions of the first pattern 20 are known, the position of the first section 22 is ascertained (i.e., the size and position of the first section are known relative to the position of the size and position of the first pattern). Therefore, the area of the first section 22 is calculated in a straight-forward manner. As illustrated in FIG. 7, this area is illustrated by dashed line 74. The actual area enclosed by the dashed line 74 may vary provided it fully encloses the first section 22 and does not extend into the second section 24. This process is assisted by having thick borders 29 and intermediate sections 28. Likewise, an area enclosing the second section 24 is determined as illustrated by dashed lines 76. Other embodiments of determining the areas of the first and second sections 22, 24 may comprise analyzing the bitmap and determining finite white space formed within the first pattern 22.

The next step in the embodiment is removing the neutral color from each of the areas of the first and second sections 22, 24 (step 610). This is accomplished on a pixel-by-pixel basis within the bitmap. Neutral pixels have substantially equal values of CMY components. In one embodiment, a pixel is considered neutral if each of the CMY values is within ten percent (10%) of the total color range. In one common system in which CMY components range from 0–255, this includes a range of twenty-five (25). By way of example, a pixel having components of C=90, M=100, and Y=95 is considered neutral because each value is within a range of 25. A pixel having components of C=90, M=100, and Y=160 is not neutral because the range is greater than 25. A black pixel, such as that forming the first pattern, is considered neutral. Further, areas of overlap between the first and second patterns 20, 30 will be considered neutral. As illustrated in FIG. 7, this is the area of the intermediate section 28 of the first pattern 20 and the second pattern 30, illustrated at 21. Upon removing the neutral color, the amount of color that remains is within the first and second sections 22, 24.

The color amount of a section is the sum of color values of each pixel in the section 22, 24 (step 612). The offset is determined using the color amounts for the sections. For a rectangle, the formula includes:

$$\text{Offset} = (C_{second} - C_{first})/(C_{second} + C_{first}) * W/2 \tag{Eq. 1}$$

with

W=nominal width of the second pattern less the nominal width of the intermediate section.

$C_{second}$=sum of color level over each pixel in the second section $C_{first}$=sum of color level over the each pixel in the first section The fringe effects may further be removed from the determined offset (step 614). Fringe effects are colored fringes placed on the white/black borders during the scanning process. The unprinted third section 26 is included within the first pattern 20 and used as a basis for removing the fringe effects. Subtracting off the fringe effects is performed by the following equation:

$$\text{Offset} = [(C_{second} - C_{third}) - (C_{first} - C_{third})]/[(C_{second} - C_{third}) + (C_{first} - C_{third})]W/2 \tag{Eq. 2}$$

which reduces to:

$$\text{Offset} = (C_{second} - C_{first})/(C_{second} + C_{first} - 2*C_{third})(W/b\ 2) \tag{Eq. 3}$$

with $C_{third}$=sum of color level over each pixel in the third section

The offset is then used to adjust the image forming units 110, 210, 310, 410 as needed to better align the different color planes.

Figure 8:
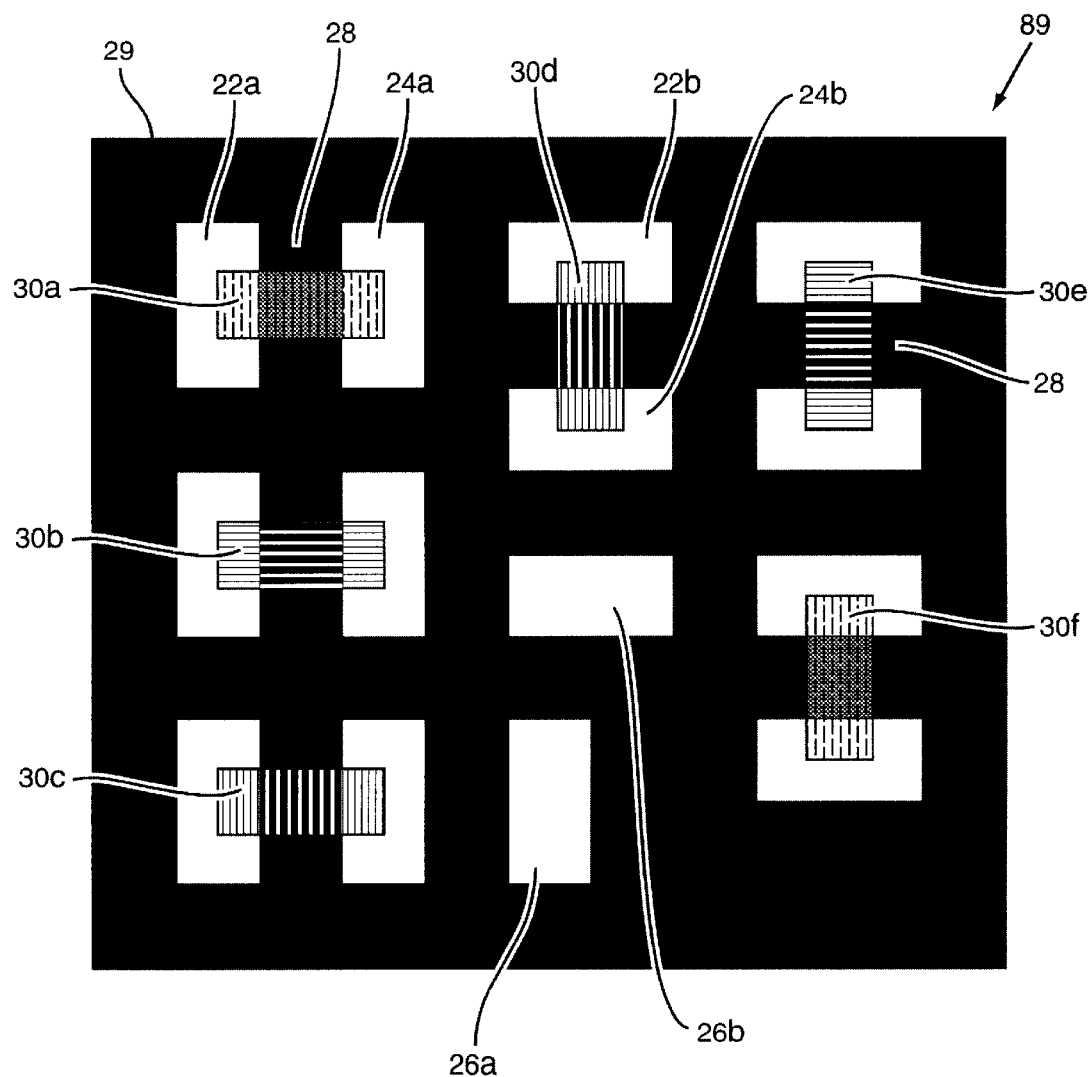
FIG. 8 is a side view illustrating a plurality of first and second target combinations for determining color plane misalignment according to one embodiment of the present invention.

FIG. 8 illustrates one example of the patterns 20, 30. The various patterns comprise determining alignment in first and second directions. In this embodiment, a set of patterns is used for determining alignment within a scanning direction, and a second set of patterns determines the alignment within a process direction. Further, each of the pattern combinations may be formed of a different color for forming the second pattern 30. In one embodiment, patterns 30a and 30d are a first color relative to black, patterns 30b and 30e test a second color relative to black, and patterns 30c and 30f test a third color relative to black. Third sections 26a, 26b are included for subtracting fringe effects from the pattern sets.

In one embodiment as illustrated in FIG. 8, the entire section 89 surrounding the patterns 20, 30 is formed in black. In another embodiment such as that illustrated in FIGS. 4 and 5, only the area immediately surrounding the patterns 20, 30 is formed in black with the remainder of the section being non-printed.

The section 89 may have a variety of sizes and dimensions. In one embodiment, the section 89 has overall dimensions of about 275/600 inch by about 240/600 inch. The intermediate sections 28 are about 25/600 inch. The patterns are spaced about ½ inch apart. The width of the second pattern 30 (excluding the intermediate section) is about 20/600. These dimensions allow for forming a pattern every one-half inch (½") over the entire page to determine misalignment over the entire page. In an 8.5 inch by 11 inch media sheet, a total of about 336 patterns can be placed on the sheet (about 16 horizontally and about 21 vertically). These dimensions provide for measuring misregistration up to 10/600 inch.

Figure 10:
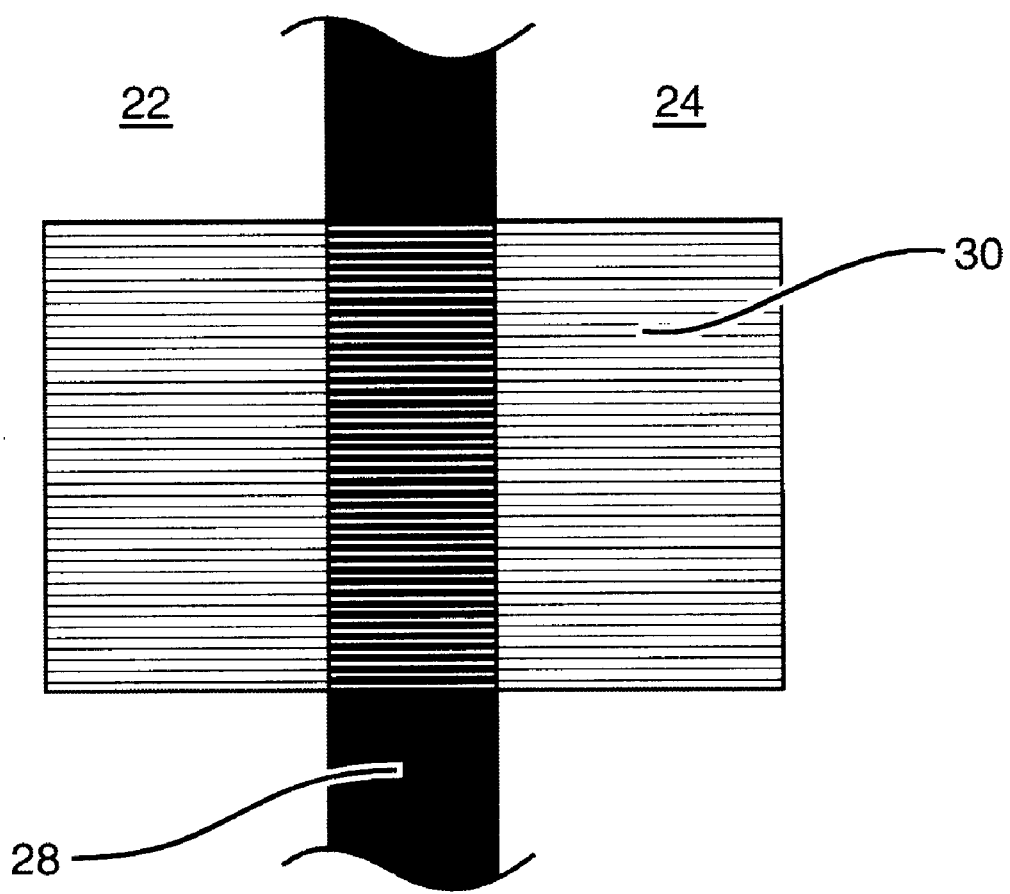
FIG. 10 is a side view illustrating another embodiment of overlapping first and second patterns.

FIG. 10 illustrates another embodiment of the present invention. The first pattern 20 comprises intermediate section 28 without any other borders defining the non-printed sections 22, 24. Second pattern 30 is positioned to overlap the intermediate section 28. The amount of misalignment between the color planes is determined by the amount of color to each side of the intermediate section 28. As illustrated in FIG. 10, this is the amount of color to the right and left of the intermediate section 28.

Figure 11:
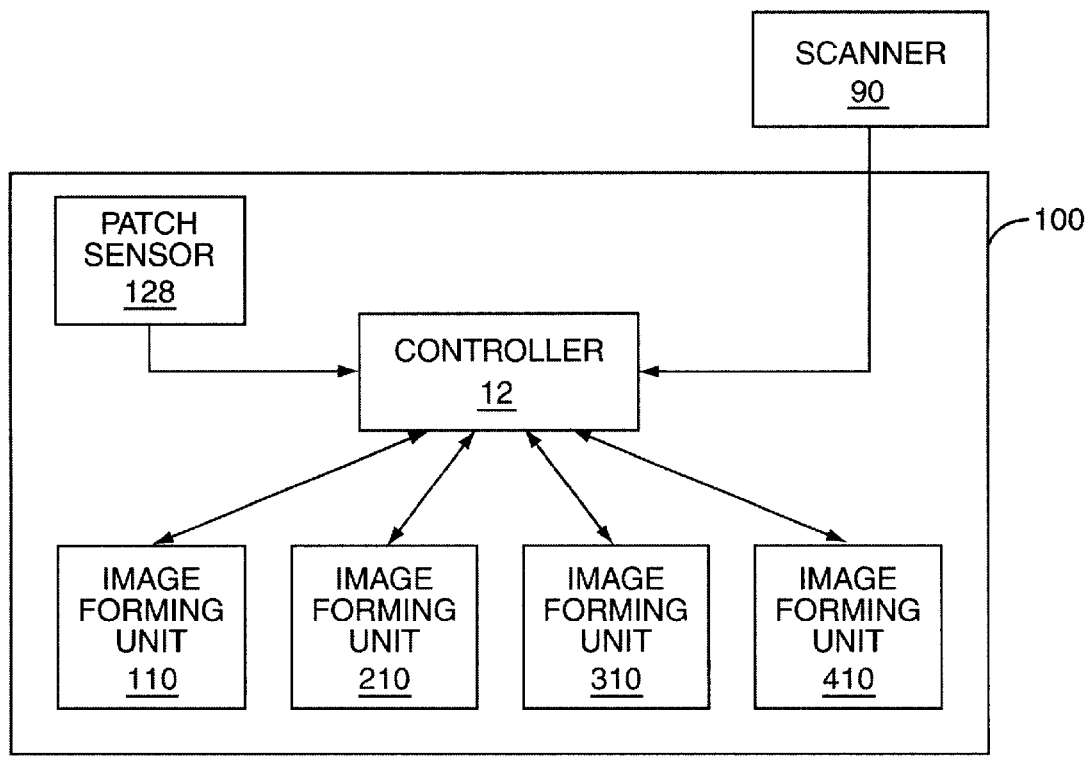
FIG. 11 is a schematic diagram illustrating the scanner, patch sensor and image forming apparatus according to one embodiment of the present invention.

FIG. 11 illustrates schematically the scanner 90 and image forming apparatus 100. In one embodiment, the first and second patterns 20, 30 are formed on a media sheet and then scanned by the scanner 90. Examples of this embodiment include forming images by placed toner on the ITM belt 500 and transferring the images to a media sheet as described in FIG. 1. One skilled in the art will understand that another manner of forming the first and second patterns 20, 30 comprises each of the separate color images of the image forming units 110, 210, 310, 410 being placed directly onto a media sheet that is passed through each image forming unit by the ITM belt 500. In these embodiments, the orientation of the color planes is not critical. The scanner 90 may be external to the image forming unit 100 and data is forwarded to a controller 12. One embodiment using this orientation is Model C750 manufactured by Lexmark International, Inc. In another embodiment (not illustrated), the scanner 90 is internal to the image forming unit 100 and signals the data to the controller 12. A variety of controllers may be used for these embodiments as is well known in the art.

In one embodiment using a scanner, the scanner is set to use gamma equal to one (1) to provide valid color area summing. Various types of scanners may be used for scanning the targets, such as typical retail market personal computer scanners manufactured by Epson, Canon, and Hewlett-Packard. In one embodiment, the scanner is an Epson Perfection 1640SU. In another embodiment, the scanner is an Epson Perfection 1240U.

In another embodiment, the patterns 20, 30 are formed onto the ITM belt 500 and scanned by a patch sensor 128. In this embodiment, the order configuration of the color planes is critical when using black to form the first pattern 20. The colored second pattern 30 must be formed prior to overlaying the black first pattern 20. The bitmap formed by the patch sensor 128 is forwarded to the controller 12 for determining the offset. In this embodiment, the area of beam illumination covers at least one side of the colored pattern in the target. Various types of patch sensors may be used for this embodiment. In one embodiment, the patch sensor is the same as that used in Printer Model C750 manufactured by Lexmark International, Inc.

Figure 12A:
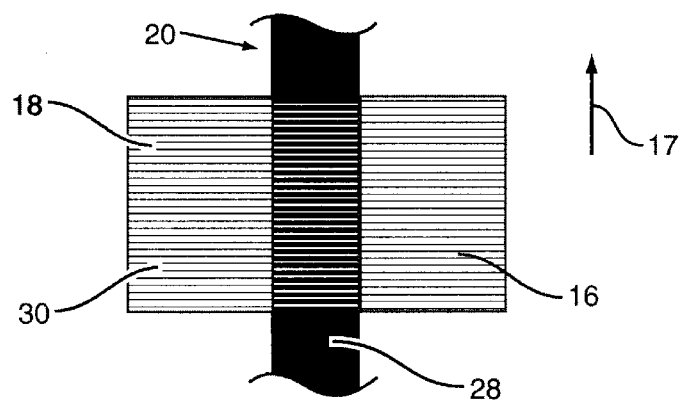
FIG. 12A is a side view illustrating one embodiment of overlapping first and second patterns.
Figure 12B:
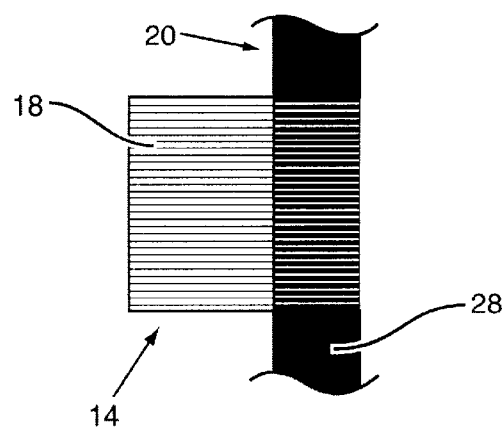
FIG. 12B is a side view illustrating a first section of the patterns of FIG. 12A.
Figure 12C:
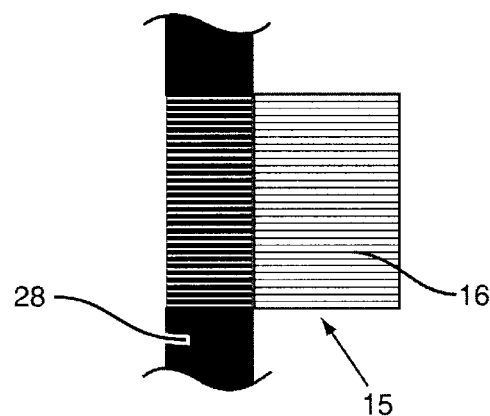
FIG. 12C is a side view illustrating a second section of the patterns of FIG. 12A.

FIGS. 12A, 12B and 12C illustrate one embodiment of determining misalignment using a patch sensor 128. This embodiment may be used for forming images on an ITM belt 500, or a media sheet. As illustrated in FIG. 12A, a first pattern 20 is formed in a first color comprising an intermediate section 28, and a second pattern 30 is formed in a second color. In one embodiment in which the first and second patterns 20, 30 are formed on an ITM belt 500, the order configuration is important as the first pattern 20 must be formed over the second pattern 30. In this embodiment, the first pattern 20 is formed in black, and the second pattern 30 is formed in cyan, magenta, or yellow. In an embodiment in which the first and second patterns 20, 30 are formed on a media sheet, the order is not important. In one embodiment, the patch sensor 128 divides the two patterns into a first section 14 illustrated in FIG. 12B comprising the part of the second pattern 30 extending over one side of the intermediate section 28, and a second section 15 illustrated in FIG. 12C comprising the part of the second pattern 30 extending over a second side of the intermediate section 28. In one embodiment, the patch sensor 128 is stationary and senses the first section 14 as it moves along the ITM belt 500 in the direction indicated by arrow 17 in FIG. 12A, and then senses the second pattern 15 as it moves along the ITM belt 500 through a point adjacent to the patch sensor 128. The determination of misalignment is performed by determining the difference of the amount of color in the first pattern 14 and the second pattern 15. The ratio of the amount of color may further be calculated to determine misalignment.

The present invention may be carried out in other specific ways than those herein set forth without departing from the scope and essential characteristics of the invention. In the embodiment illustrated, four separate image forming units are included for forming images in four separate colors. Further, the image forming apparatus may form images using a variety of different techniques that are well known in the art. In one embodiment, the toner images are transferred from the photoconductive drum to a media sheet that is transported by the ITM belt 500. In one embodiment, the first and second patterns 20, 30 can be formed at a variety of orientations and angles to determine misalignment in various directions. The present embodiments are, therefore, to be considered in all respects as illustrative and not restrictive, and all changes coming within the meaning and equivalency range of the appended claims are intended to be embraced therein.

What is claimed is:

1. A method of determining misalignment between two color planes comprising the steps of:
   a) forming a first pattern having first and second non-printed sections, the first pattern being formed in a first color;
   b) forming a second pattern that extends into the first and second non-printed sections, the second pattern being formed in a second color; and
   c) determining an amount of misalignment based on a difference of the second color in the first and second non-printed sections.

2. The method of claim 1, wherein the first and second non-printed sections have the same dimensions.

3. The method of claim 1, wherein the second pattern comprises symmetrical first and second halves such that perfect alignment results in equal amounts of the second pattern in each of the first and second non-printed sections.

4. The method of claim 1, wherein the first and second non-printed sections of the first pattern are surrounded by a border.

5. The method of claim 1, wherein the first and second patterns are formed on an intermediate transport mechanism and the first pattern is formed on top of the second pattern.

6. The method of claim 1, wherein the first and second patterns are formed on a media sheet.

7. The method of claim 1, wherein the first and second non-printed sections, and the second pattern are rectangles.

8. The method of claim 1, further comprising determining the amount of misalignment based a ratio of the difference of the second color in the first and second non-printed sections and a sum of the second color in the first and second non-printed sections.

9. The method of claim 1, wherein the first pattern is formed in a neutral color.

10. A method of determining color plane alignment between first and second color planes comprising:
    a) forming a first image at a predetermined position, the first image being formed with a first color;
    b) forming a second image at the predetermined position, the second image extending on a first side and a second side of the first image, the second image being formed with a second color;
    c) determining a first amount of the second image that extends beyond the first image on a first side;
    d) determining a second amount of the second image that extends beyond the first image on a second side; and
    e) determining an alignment of the first and second color planes based on a difference between the first amount and the second amount.

11. The method of claim 10, wherein the step of determining the alignment of the first and second color planes comprises determining a ratio of the difference between the first amount and the second amount and a sum of the second color that extends on the first side and second side of the first image.

12. The method of claim 10, further comprising moving the first and second images relative to a patch sensor and sensing the first amount, and then moving the first and second images again relative to the patch sensor and sensing the second amount.

13. The method of claim 10, further comprising forming the second image in a rectangular shape.

14. The method of claim 13, wherein the first color is black.

15. The method of claim 13, wherein the first pattern further comprises an intermediate section between the first and second sections, the step of removing the first pattern such that the second color within the first and second sections remains comprises removing the amount of the second pattern that overlaps the first pattern at the intermediate section.

16. A method of determining misalignment between two image forming units within an image forming apparatus, the method comprising the steps of:
    a) forming a first pattern in a first color, the first pattern comprising first and second sections of equal dimensions;
    b) forming a second pattern in a second color, the second pattern comprising a symmetrical shape and extending into the first and second sections;
    c) removing the first pattern such that the second color within the first and second sections remains;
    d) determining an amount of color remaining within the first and second sections; and
    e) determining an alignment amount from a difference between the amount of color remaining within the first section and the second section.

17. The method of claim 16, wherein the step of determining the alignment amount further comprises determining a ratio of the difference between the amount of color remaining within the first section and the second section and a sum of the second color remaining within the first and second sections.

18. A method of determining misalignment between two color planes comprising the steps of:
    a) forming a first pattern having a first section and a second section;
    b) forming a second pattern that overlaps the first pattern and extends into the first and second sections;
    c) obtaining a bitmap of the first and second patterns, the bitmap comprising color component values for each pixel location;
    d) determining an amount of color within the first section and second sections using the color component values; and
    e) determining an amount of misalignment based on a ratio of a difference of color remaining in the first and second sections and the amount of color within the first section and the second section.

19. A method of determining misalignment between two color planes comprising the steps of:
    a) forming a first pattern having first and second non-printed sections, the first pattern being formed in a first color;
    b) forming a second pattern that extends into the first and second non-printed sections, the second pattern being formed in a second color;
    c) forming a third non-printed section;
    d) determining a fringe effect in the third non-printed section;
    e) determining an amount of the second color within the first non-printed section;
    f) determining an amount of the second color within the second non-printed section;
    g) determining a final first color amount within the first non-printed section by subtracting the fringe effect from the amount of the second color within the first non-printed section;
    h) determining a final second color amount within the second non-printed section by subtracting the fringe effect from the amount of the second color within the second non-printed section; and
    i) determining misalignment based on a ratio of a difference of the final first color amount and the final second color amount and a sum of the final first color amount and final second color amount.

20. The method of claim 19, wherein the third non-printed section is the same shape and size as the first and second non-printed sections.

21. A method of determining misalignment between two color planes in an image forming apparatus, the method comprising the steps of:
    a) forming an image comprising a first color and a second color in overlapping arrangement;
    b) determining a first color amount comprising an amount of the first color within a first section;
    c) determining a second color amount comprising an amount of the first color within a second section; and
    d) determining misalignment of the first and second colors based on a ratio of the difference between the first color amount and second color amount and a sum of the first color amount and the second color amount.

* * * * *